United States Patent
Andrianov et al.

(10) Patent No.: US 12,335,760 B2
(45) Date of Patent: Jun. 17, 2025

(54) METHOD AND APPARATUS FOR CONTROLLING OVER PERFORMANCE MEASUREMENTS

(71) Applicant: Nokia Technologies Oy, Espoo (FI)

(72) Inventors: Anatoly Andrianov, Schaumburg, IL (US); Jing Ping, Sichuan (CN); Olaf Pollakowski, Berlin (DE)

(73) Assignee: Nokia Technologies Oy, Espoo (FI)

( * ) Notice: Subject to any disclaimer, the term of this patent is extended or adjusted under 35 U.S.C. 154(b) by 871 days.

(21) Appl. No.: 17/278,885

(22) PCT Filed: Sep. 28, 2018

(86) PCT No.: PCT/CN2018/108508
§ 371 (c)(1),
(2) Date: Mar. 23, 2021

(87) PCT Pub. No.: WO2020/062116
PCT Pub. Date: Apr. 2, 2020

(65) Prior Publication Data
US 2022/0053354 A1    Feb. 17, 2022

(51) Int. Cl.
*H04W 24/00*    (2009.01)
*H04W 24/10*    (2009.01)

(52) U.S. Cl.
CPC .................................. *H04W 24/10* (2013.01)

(58) Field of Classification Search
CPC .............................. H04W 24/10; H04W 24/12
USPC .......................................... 455/423; 370/338
See application file for complete search history.

(56) References Cited

U.S. PATENT DOCUMENTS

2014/0219107 A1*    8/2014    Racz .................. H04L 41/0631
                                                        370/242
2017/0303156 A1    10/2017    Kimura et al.

FOREIGN PATENT DOCUMENTS

| CN | 101056219 A | 10/2007 |
| CN | 101299860 A | 11/2008 |
| CN | 102164375 A | 8/2011 |
| CN | 103023685 A | 4/2013 |
| CN | 103476045 A | 12/2013 |

(Continued)

OTHER PUBLICATIONS

3GPP TS 28.550 V2.0.0 (Sep. 2018), "3rd Generation Partnership Project; Technical Specification Group Services and System Aspects; Management and orchestration; Performance assurance (Release 15)", 58 pgs.

(Continued)

*Primary Examiner* — Marcos Batista
(74) *Attorney, Agent, or Firm* — McCarter & English LLP

(57) ABSTRACT

A method and an apparatus for controlling over performance measurements. The method includes associating a measurement list with a containing MOI; associating number of MCIs with said containing MOI according to said measurement list; collecting measurement records according to attributes of at least one of said MCIs after said at least one MCI is activated; processing the measurement records and making them available to number of consumers. The solution is aligned with Services Based Management Architecture management paradigm that 3GPP SA5 introduced for 5G management in 3GPP Rel-15, which increases flexibility of both Management and Managed Entity, and enables reusability of the measurement data and tasks.

23 Claims, 3 Drawing Sheets

(56) References Cited

FOREIGN PATENT DOCUMENTS

| | | |
|---|---|---|
| CN | 103581964 A | 2/2014 |
| CN | 103873297 A | 6/2014 |
| CN | 104185195 A | 12/2014 |
| EP | 2 541 977 A1 | 1/2013 |
| EP | 3 837 808 A0 | 2/2020 |
| JP | 2007048315 A | 2/2007 |
| JP | 2013520886 A | 6/2013 |
| WO | WO-2017/222613 A1 | 12/2017 |
| WO | WO-2018/142092 A1 | 8/2018 |

OTHER PUBLICATIONS

3GPP TS 32.411 V15.0.0 (Jun. 2018), "3$^{rd}$ Generation Partnership Project; Technical Specification Group Services and System Aspects; Telecommunication management; Performance Management (PM) Integration Reference Point (IRP): Requirements (Release 15)", 9 pgs.

3GPP TS 32.412 V15.0.0 (Jun. 2018), "3$^{rd}$ Generation Partnership Project; Technical Specification Group Services and System Aspects; Telecommunication management; Performance Management (PM) Integration Reference Point (IRP): Information Service (IS) (Release 15)", 68 pgs.

3GPP TS 32.413 V9.0.0 (Dec. 2009), "3rd Generation Partnership Project; Technical Specification Group Services and System Aspects; Telecommunication management; Performance Management (PM) Integration Reference Point (IRP): Common Object Request Broker Architecture (CORBA) Solution Set (SS) (Release 9)", 24 pgs.

3GPP TS 32.414 V6.1.0 (Sep. 2005), "3rd Generation Partnership Project; Technical Specification Group Services and System Aspects; Telecommunication management; Performance Management (PM); Integration Reference Point (IRP): Common Management Information Protocol (CMIP) Solution Set (SS)", 26 pgs.

3GPP TS 32.415 V9.0.0 (Dec. 2009), "3rd Generation Partnership Project; Technical Specification Group Services and System Aspects; Telecommunication management; Performance Management (PM) Integration Reference Point (IRP); extensible Markup Language (XML) definitions (Release 9)", 13 pgs.

3GPP TS 32.416 V15.0.0 (Jun. 2018), "3rd Generation Partnership Project; Technical Specification Group Services and System Aspects; Telecommunication management; Performance Management (PM) Integration Reference Point (IRP); Solution Set (SS) definitions (Release 15)", 52 pgs.

3GPP TS 32.417 V9.0.0 (Dec. 2009), "3rd Generation Partnership Project; Technical Specification Group Services and System Aspects; Telecommunication management; Performance Management (PM) Integration Reference Point (IRP): SOAP Solution Set (SS) (Release 9)", 28 pgs.

3GPP TS 28.532 V15.0.1 (Sep. 2018), "3$^{rd}$ Generation Partnership Project; Technical Specification Group Services and System Aspects; Management and orchestration; Generic management services; (Release 15)", 140 pages.

3GPP TS 28.550 V1.3.0 (Aug. 2018), "3$^{rd}$ Generation Partnership Project; Technical Specification Group Services and System Aspects; Management and orchestration; Performance assurance (Release 15)", 58 pages.

3GPP TSG-SAS Meeting #121, S5-186404(197), "Measurement control NRM fragment", Ericsson et al., Oct. 8-12, 2018, 6 pages.

3GPP TSG SA WG5 (Telecom Management) Meeting #120, Belgrade, Serbia, Aug. 20-24, 2018, S5-185562 (058), "PM control", Ericsson, 4 pgs.

* cited by examiner

METHOD AND APPARATUS FOR CONTROLLING OVER PERFORMANCE MEASUREMENTS

CROSS REFERENCE TO RELATED APPLICATION

This patent application is a U.S. National Stage application of International Patent Application Number PCT/CN2018/108508 filed Sep. 28, 2018, which is hereby incorporated by reference in its entirety.

FIELD OF THE INVENTION

The present disclosure relates to a technique for controlling over performance measurements.

BACKGROUND OF THE INVENTION

The existing method for Measurement Administration (MA), for example, measurement job administration, measurement record generation, measurement reporting, and measurement storage, etc., specified in 3GPP SA5 is tightly coupled the PM (performance measurement) service consumer and producer with mandated operations between them. In current 3GPP SA5 PM specifications, PM Measurement Administration, which determines which measurement types, on which measured resources, at which times, is standardized either as PM interface IRP (TSs 32.411-32.417 in 3GPP releases prior to Rel-15) or as Management Service component Type A (in draft TS 28.550 in 3GPP Rel-15). Based on the standard, the IRP Agent/PM Service Producer provides an interface to specific IRP Manager/PM Service Consumer to manage the job for Measurement Generation and Reporting.

This interface and tightly coupled design pattern is incompatible with Services Based Management Architecture management paradigm that 3GPP SA5 introduced for 5G management in 3GPP Rel-15. It's also not aligned with the model driven concept in modern management system design. In addition, it introduced inflexibility and complexity for both service producer and consumer. Hence, it's rarely adopted by operators and vendors.

S5-185562 pCR contributed to SA5#120 proposed the use of two NRM fragments, «IOC»PMControl in Managed Element (ME) and «datatype»Measurement in Managed Function (MF), to support continuously reporting PM data and/or periodically capturing PM data on files for delivery to PM data consumers.

In 5G NRM (3GPP TS 28.541) the Network Slice and Network Slice Subnet are inherited from Subnetwork, therefore, the ME level control (proposed in S5-185562) can't support instances of Network Slice and NSS. In addition, as there could be only one name-contained «IOC»PMControl instance for one ME instance, the approach described in S5-185562 does not support multiple measurement jobs for the same ME and its contained MFs, hence cannot support multi-tenancy which in turn is essential for the Network Slicing feature in 5G. Also, the approach can't support activate/suspend the measurement control of contained Managed Functions independently.

SUMMARY OF THE INVENTION

To define a feasible and effective way for performance measurements generation, aggregating and reporting, this disclosure introduces a new Network Resource Model (NRM) based method, in which both measurements themselves and their controls are associated with the Measured/Managed Object. With this approach, the PM service consumer uses Managed Object Instances (corresponding to the IOCs defined in the NRM) to express what performance data it expects from the PM service provider/producer, for example which measurement, when the measurement to be collected, how frequently, etc., but does not mandate how does the provider/producer fulfills the request. PM service provider/producer has autonomy and flexibility to decide how to implement (or even whether to delegate it to other entities) the measurement collection and reporting according to the measurement control requirements reflected in the NRM.

This disclosure introduces both (measurements and measurement control) in Managed Object hierarchy (on both Subnetwork and Managed Function levels) to support measurements reporting and administration in various MOIs (Managed Object Instances) including NSI, SSI, NF, etc. In addition, it supports multiple tenants at each level.

In one embodiment, an aspect of this disclosure relates to a method for controlling over performance measurements, wherein said method comprising:
  associating a measurement list with a containing MOI (Managed Object Instance);
  associating number of MCIs (Measurement Control Instances) with said containing MOI according to said measurement list;
  collecting measurement records according to attributes of at least one of to said MCIs after said at least one MCI (Measurement Control Instance) activated;
  processing the measurement records and make them available to number of consumers.

In another embodiment, an aspect of this disclosure relates to an apparatus for controlling over performance measurements, wherein said apparatus comprising:
  a module for associating a measurement list with a containing MOI;
  a module for associating number of MCIs with said containing MOI according to said measurement list;
  a module for collecting measurement records according to attributes of at least one of said MCIs after said at least one MCI is activated;
  a module for processing the measurement records and make them available to a consumer.

In another embodiment, an aspect of this disclosure relates to a computer readable storage medium, storing the computer code, when the computer code is executed, the aforementioned method is executed.

In another embodiment, an aspect of this disclosure relates to a computer program product, when the computer program product is executed, the aforementioned method is executed.

In another embodiment, an aspect of this disclosure relates to a computer product, comprising:
  one or more processors;
  storage of storing one or more computer programs; when the one or more computer programs are executed by the one or more processors, the one or more processors are caused to implement the aforementioned method.

Different to existing Management Entity oriented design, this disclosure is Network Resource Model based Managed Object (MO) centric design. In this new design pattern, the measurements and measurement controller are contained in a same MO, which can be either defined by the operator or derived from its parent/child MOs. Its Management Entity independent, hence can be flexible and reusable by internal or external management entities.

In summary, compare to existing solution of 3GPP and prior art, this disclosure has the following advantages:

The solution in this disclosure is aligned with Services Based Management Architecture management paradigm that 3GPP SA5 introduced for 5G management in 3GPP Rel-15, which increased flexibility of both Management and Managed Entity, and enabled reusability of the measurement data and tasks.

Association of the performance measurements with provisioning attributes of the same MOI in the NRM, hence facilitates the creation of closed automation loops addressing performance data collection, analytics, self-optimization and healing.

This disclosure supports measurements reporting and administration in various MOIs at multiple levels, and allows to administrate the measurement control independently on different MOIs, and for different tenants The propagation mechanism introduced in the disclosure allows the performance measurements collection and reporting requirements of the service to be automatically populated to the constituent managed and management functions, hence further simplifies the operation and enables self-organization.

BRIEF DESCRIPTION OF DRAWINGS

Other features, purposes and advantages of the invention will become more explicit by means of reading the detailed statement of the non-restrictive embodiments made with reference to the accompanying drawings.

Figure 1:
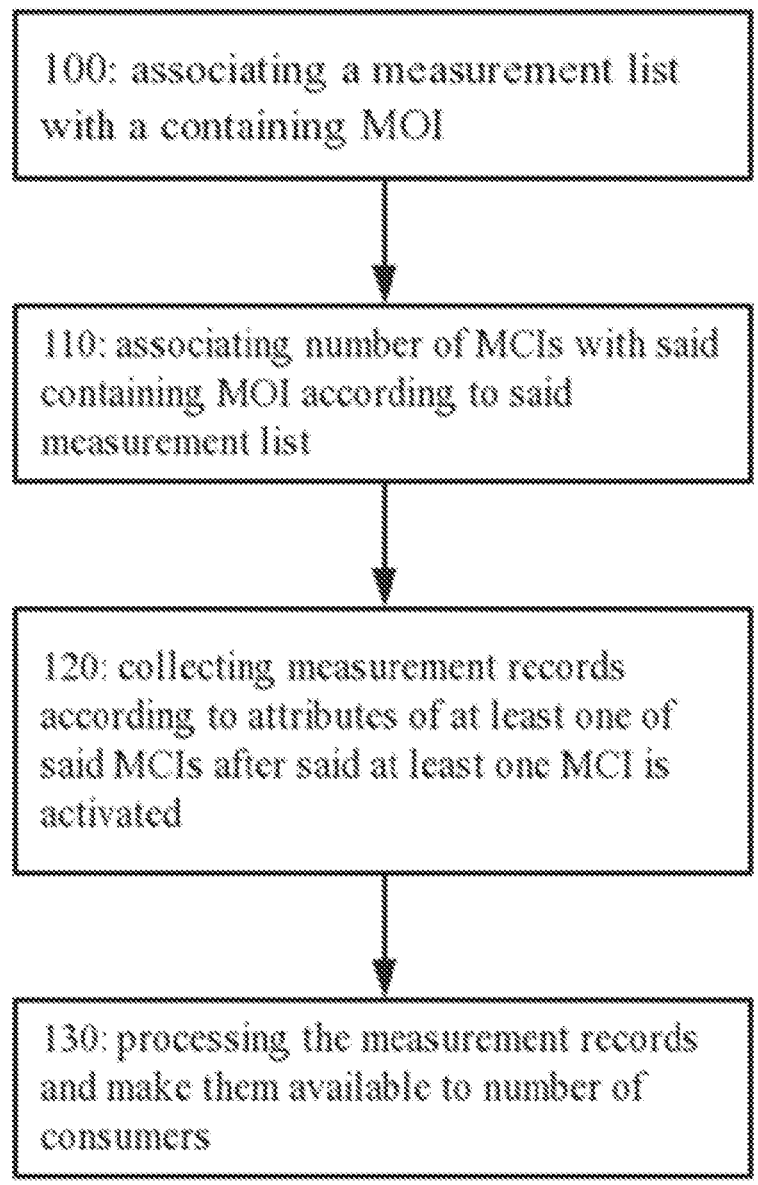
FIG. 1 is a flow chart illustrating a method of the present disclosure for controlling over performance measurements in 5G network.

The same or similar reference signs in the drawings represent the same or similar component parts.

DETAILED DESCRIPTION AND PREFERRED EMBODIMENT

The present disclosure will now be discussed in detail with regard to the attached drawing figures which are briefly described above. In the following description, numerous specific details are set forth illustrating the applicant's best mode for practicing the disclosure and enabling one of ordinary skill in the art of making and using the disclosure. It will be obvious, however, to one skilled in the art that the present disclosure may be practiced without many of these specific details. In other instances, well-known machines and method steps have not been described in particular detail in order to avoid unnecessarily obscuring the present disclosure. Unless otherwise indicated, like parts and method steps are referred to with like reference numerals.

Referring to FIG. 1, an embodiment of a method for controlling over performance measurements, comprising:

at step 100, associating a measurement list with a containing MOI;

at step 110, associating number of MCIs with said containing MOI according to said measurement list;

at step 120, collecting measurement records according to attributes of at least one of said MCIs after said at least one MCI is activated;

at step 130, processing the measurement records and make them available to a consumer.

Here, the disclosure uses 5G for the embodiments. It should also be noted that while targeting primarily 5G, the method of this disclosure may be applied to other fields, for example, mobile networks of previous generations (such as LTE), fixed networks and loud management, etc.

Specifically, at step 100, a measurement list is associated with a containing MOI. Here, a measurement list may be created before the containing MOI is created or be created after the containing MOI is created. What happens here is the association of such measurement list with a containing MOI.

For example, at step 100, after creating a MOI of a MF (Managed Function), a measurement list related to the MF can be associated with the MOI through the Network Function Management Function (NFMF) for managing the MF, wherein the measurement list is contained in the containing MOI. The MOI includes but not limited to NSI, NSSI, NF, etc. The MO associated with MOI corresponds to at least any one of Subnetwork, Network Slice, Network Slice Subnet, Managed Element, Managed Function, Network Function Virtualization Network Service.

At step 110, number of MCIs are associated with said containing MOI according to said measurement list, wherein the measurements contained in the MCIs should be listed in the measurements of the containing MOI. Here, the number of MCI can be zero, one or several. The number of MOI also can be zero, one or several.

Figure 2:
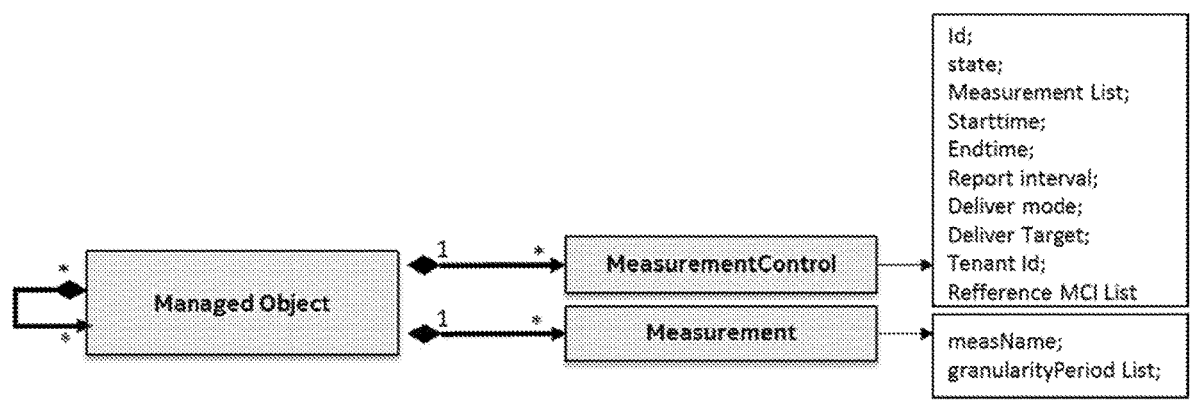
FIG. 2 is a block diagram illustrating Measurement Control and Measurement.

Referring to FIG. 2, the attributes of a Measurement Control (MC) include id, state, measurement list, start time, end time, report interval, deliver mode, deliver target, tenant id, referenced MC list, etc.

A new MCI can be added to a MOI. The measurements contained in the MCI should be listed in the measurements of the containing MOI, and the granularityPeriod of a measurement should match one of granularityPeriod in the granularityPeriod list of the measurement.

An existing MCI of a MOI can be updated. The new measurements introduced in the measurement control should be listed in the measurements of to the containing MOI, and the updated granularityPeriod of a measurement should match one of granularityPeriod in the granularityPeriod list of the measurement. An existing MCI of a MOI should be updated accordingly if measurements of the MOI updated.

An existing MCI of a MOI can be activated or suspended. After the existing MCI is activated, the NFMF for managing the MF starts to collect measurement records. If the existing MCI is suspended, the NFMF will stop collecting measurement records.

The Stereotype of MeasurementControl can be InformationObjectClass (IOC), dataType, SupportIOC or any other Stereotype in 3GPP TS 32.152 or OMG Unified Modeling Language Specification, Version 1.5

Alternatively, associating number of MCIs with said containing MOI comprising at least any one of:

customizing number of MCIs according to different consumer requirements and associating the MCIs with said containing MOI;

aggregating number of MCIs of a parent MOI to number of MCIs of a child MOI, and associating the MCIs of the child with the child MOI;

aggregating number of MCIs of number of child MOIs to number of MCIs of a parent MOI, and associating the MCIs of the parent with the parent MOI;

deriving number of MCIs of a child MOI from number of MCIS of number of parent MOIs, and associating the MCIs of the child with the child MOI;

associating a default MCI with said containing MOI, wherein the default MCI including all measurements contained in said containing MOI.

Specifically, number of MCIs can be customized according to different consumer requirements and the MCIs are associated with the containing MOI. Here, as the PM service consumer, it just need to describe what performance to data it expected from the PM service provider/producer, for example which measurement, when is the measurement collected in what interval, etc., but should not mandate how does the provider/producer implement the requirement.

Also, a default MCI can be associated with the containing MOI, wherein the default MCI including all measurements contained in said containing MOI. For example, a default Measurement Control Instance (MCI) is created and activated after the containing MOI is created. The default MCI includes all measurements contained in the same MOI, the granularityPeriod of the measurement is the minimum one in the granularityPeriod list of the measurement, the start time is set to now, the end time is forever, the deliver mode is pull, the deliver target is a predefined local address, and the state is active. If there is no other MCI, the Management Function of the MO will collect measurement records according to attributes of the default MCI, for example, the measurement name and interval defined in the default MCI.

In this disclosure, number of MCIs of a parent MOI can be propagated to number of MCIs of a child MOI, and the MCIs of the child are associated with the child MOI; number of MCIs of number of child MOIs are aggregated to number of MCIs of a parent MOI, and the MCIs of the parent are associated with the parent MOI; and number of MCIs of a child MOI can be derived from number of MCIs of number of parent MOIs, and the MCIs of the child are associated with the child MOI. And only applicable MCI attributes are propagated or derived. Especially, only applicable MCI attributes of child MOIs are propagated from the child MOIs to aggregate MCIs of the parent MOI. The features are described as below:

1. The MCI of a child MOI can be propagated (pushed-"down" or pulled "up") from its parent MOIs.
   1) After a MCI of a MOI is created and configured, one or more MCIs of child MOIs of the MOI are derived from the MCI of the parent MOI.
   2) Alternatively, after a child MOI is created, its managing entity can pull MCI information from its parent MOI and create MCI of this child MOI accordingly.
   3) The state and other attributes of a MCI of a child MOI are deduced from the state and related attributes of the MCI of the parent MOI.
   4) Only MCI attributes applicable to the child MOI can be derived from the MCI associated with the parent MOI.
   5) The referenced MCI of the parent MOI should be reflected in the child MCI.
   6) The update of a MCI of a parent MOI could be reflected on the MCIs of its child MOIs if the MCI is derived from the MCI of the parent MOI.

2. The MCI of a parent MOI can be propagated (only pulled "down") from its child MOIs.
   1) After a child MOI is created, the managing entity of its parent MOI can pull MCI information from the child MOI and create/update MCI of this parent MOI accordingly, if relevant measurements in MCI of the child MOI were not included in any MCI of the parent MOI.
   2) The state and other attributes of a MCI of a parent MOI are deduced from the state and related attributes of the MCI of the child MOI.
   3) The referenced MCI of the child MOI should be reflected in the parent MCI.
   4) Only applicable MCI attributes of child MOIs are propagated from the child MOIs to aggregate MCIs of the parent MOI.

Here, the parent and child MOIs which propagated MCIs can be managed by same or different Management Entities/Functions.

Alternatively, associating number of MCIs with said containing MOI comprising:

to creating a common MCI of said containing MOI to support multiple MCIs with same or similar requirements.

Here, a common MCI of the MOI could be created to support multiple MCIs with same or similar requirements. For example, the multiple MCIs with same or similar requirements can share measurement record or report instead of collecting again.

At step 120, the NFMF for managing the MF collects measurement records according to attributes of at least one of said MCIs, for example, measurement name and interval defined in measurements contained in at least one of said MCIs, or other attributes like start/end time, etc., after said at least one MCI is activated. The measurement information includes measurement name and supported granularityPeriod list which are put in the supplementary list.

The Stereotype of supported Measurements can be InformationObjectClass (IOC), dataType, SupportIOC or any other Stereotype in 3GPP TS 32.152 or OMG Unified Modeling Language Specification, Version 1.5.

This disclosure supports many types of Managed Object including Subnetwork, Network Slice, Network Slice Subnet, Managed Element, Managed Function, NFV Network Slice, etc.

At step 130, said measurement records are processed and made available to number of consumers. Based on the requirements of a contained MCI of a MOI, the Management Function of the MO collects measurement records and processes the measurement records and made them available to number of consumers.

Here, the number of consumers can be zero, one or several.

Alternatively, processing the measurement records comprising any one of:

formatting said measurement records to a measurement report;

aggregating measurement records from different MOIs to a measurement report;

keeping raw measurement records.

Alternatively, making the measurement records available to number of consumers comprising any one of:

delivering the measurement report to number of consumers;

allowing number of consumers to retrieve the measurement report, streaming raw measurement records to number of consumers.

Specifically, the Management Function of the MO formats the measurement records to a measurement report, stores the collected measurement records, deliver the measurement report to number of consumers or allow number of consumers to retrieve the measurement report.

Also, the Management Function of the MO can aggregate the collected measurement records from different MOIs to a measurement report, stores the collected measurement records, deliver the measurement report to the consumer or allow number of consumers to retrieve the measurement report. Here, the way that MF collect, aggregate, format record, store and deliver and/or make available the report can be different.

Alternatively, the Management Function of the MO can keep raw measurement records and stream the raw measurement records to the number of consumers.

Then, according to the analytics result based on the measurement reports of a MOI, the attributes, Measurements and Measurement Controls of the MOI can be updated and refined for better support performance management.

Alternatively, said method further comprising:
adding, deleting or updating measurements contained in the several MCIs according to adding, deleting or updating measurements contained in said measurement list of said containing MOI.

Alternatively, said method further comprising:
adding, deleting or updating number of MCIs of a MOI according to adding, deleting or updating number of MCIs of number of child MOIs of the MOI.

Alternatively, said method further comprising:
checking state and attributes' value of said at least one MCI.

There are two embodiments to show the method for controlling over performance measurements in 5G network, as below:

Embodiment 1 shows the Performance Measurements collect and report for a Managed Function, e.g. AMF function.
1) After creating a AMF MOI, a measurement list related to the AMF (for example, [{Mean number of registered subscribers, [1, 5, 10, 20]}, {Maximum number of registered subscribers, [2, 5, 10, 20]} ]) can be provisioned or imported, and associated to the AMF instance through the Network Function Management Function (NFMF) for managing the AMF.
2) A default Measurement Control Instance (MCI) for the AMF instance is created and activated by the NFMF. The attributes of the MCI will be looked as {mci-amfid-123456, active, [{Mean number of registered subscribers, 1}, {Maximum number of registered subscribers, 2}], 20303009152018, 24595912319999, 10, pull, /pm/report/core/amf/mci-123456-20303009152018, att}, and associated to the AMF.
3) If there's no other MCI, the default MCI is used to collect and report the measurements.
4) A customized MCI can be created and provisioned through service of NFMF and associated to the AMF instance. The measurement of the MCI can only be Mean number of registered subscribers or Maximum number of registered subscribers, and the granularity-Period value of Mean number of registered subscribers should be should be one of 1, 5, 10, 20, and Maximum number of registered subscribers should be one of 2, 5, 10, 20.
5) If Mean number of registered subscriber measurement is deleted from the measurement list of the AMF instance, the same measurement should be deleted from the MCIs of the AMF instance.
6) If a new measurement is added to the measurement list of the AMF instance, the same measurement should be added to the default MCIs of the AMF instance, and could be added to other MCIs of the AMF instance.
7) Once a MCI of the AMF instance is activated, the NFMF for managing the AMF start to collect the measurement records according to the measurement name and interval defined in the MCI, and aggregate and report the measurements based on report interval. For example, based on default MCI of the AMF instance, the NFMF collect Mean number of registered subscribers every 1 minute and Maximum number of registered subscribers every 2 minutes, and aggregate the measurement records in one report and put the report file to the target address every 10 minutes.
8) The authorized consumer of the performance data can get the Measurement Control Instance information through NFMF, and retrieve the measurement report.
9) After the consumer analysis the report of the AMF instance, it may provision the measurements or MCI of the AMF instance to e.g. optimize measurements collection frequency Embodiment 2 shows the Performance Measurements collect and report for a Network Slice Subnet Instance (NSSI), including top down Measurement Control Propagation.
1) The monitored NSS (e.g. nss-e2e) is a NSS composed of several gNB related Managed Functions (e.g. gnbdu-1) and a Core NSS (e.g. core-nss-1). The core NSS composes of an AMF (e.g. amf-1), a SMF (e.g. smf-1), a UPF (e.g. upf-1) and other Core Managed Functions.
2) After creating a NSSI, a measurement list related to the NSSI (for example, [{Delay, [1, 5, 10, 20]}, {DL Delay, [1, 5, 10, 20]}, {Number of emergency registration requests, [2, 5, 10, 20]} ]) can be provisioned or imported, and associated to the NSSI through the NSS Management Function (NSSMF) for managing the NSSI.
3) A customized MCI is created and provisioned through service of NSSMF and associated to the NSSI. For example, the MCI is like {mci-nssid-123456, active, [{DL Delay, 1}, {Number of emergency registration requests, 2}], 20303009152018, 24595912319999, 10, pull, /pm/report/nss/mci-nss-e2e-123456-20303009152018, att}.
4) Several MCIs are propagated in the child MOIs of the NSSI based on the MCI of the parent NSSI. E.g. to support DL Delay measurement of the MCI of the NSSI nss-e2e, one MCI is propagated in child gNB Managed Function (gnbdu-1) which looked like {mci-gnb-123456, active, [{DL Delay, 1}], 20303009152018, 24595912319999, 10, /pm/report/gnb/mci-gnb-123456-20303009152018, att}. Another MCI is propagated in child Core NSS (core-nss-1) which looked like {mci-nssid-123400, active, [{DL Delay, 1}], 20303009152018, 24595912319999, 10, pull, /pm/report/nss/mci-nss-123400-20303009152018, att}, further a MCI is propagated to a related child Managed Function (e.g. upf-1) of the Core NSS (core-nss-1) based on the traffic delay related MCI of the Core NSS. The MCI of the UPF is like {mci-upf-123456, active, [{DL Delay, 1}], 20303009152018, 24595912319999, 10, pull, /pm/report/gnb/mci-upf-123456-20303009152018, att}. Similarly, a MCI related to emergency registration will be propagated to the Core NSS (nss-core-1) and AMF (amf-1) of the Core NSS according to the MCI of nss-e2e.
5) Once the MCI of the NSSI (nss-e2e) is activated, the NSSMF for managing the NSSI trigger the NSSMF/NFMF for managing its child MOI to active related MCIs, then start to collect, aggregate and report the measurement accordingly.

6) The authorized consumer of the performance data of the NSSI can get the MCI information through NSSMF, and retrieve the relevant measurement report 7) After the consumer analysis the report of the NSSI, it may provision the measurements or MCI of the NSSI to e.g. optimize measurement collection frequency, or trigger to scale the NSSI In another embodiment, an aspect of this disclosure relates to an apparatus for controlling over performance measurements, wherein said apparatus comprising:

a module for associating a measurement list with a containing MOI, hereinafter called first module;

a module for associating number of MCIs with said containing MOI according to said measurement list, hereinafter called second module;

a module for collecting measurement records according to attributes of at least one of said MCIs after said at least one MCI is activated, hereinafter called third module;

a module for processing the measurement records and make them available to a consumer, hereinafter called fourth module.

Specifically, the first module associates a measurement list with a containing MOI. Here, a measurement list may be created before the containing MOI is created or be created after the containing MOI is created. What happens here is the association of such measurement list with a containing MOI.

For example, after creating a MOI of a MF (Managed Function), the first module associates a measurement list related to the MF with the MOI through the Network Function Management Function (NFMF) for managing the MF, wherein the measurement list is contained in the containing MOI. The MOI includes but not limited to NSI, NSSI, NF, etc. The MO associated with MOI corresponds to at least any one of Subnetwork, Network Slice, Network Slice Subnet, Managed Element, Managed Function, Network Function Virtualization Network Service.

The second module associates number of MCIs with said containing MOI according to said measurement list, wherein the measurements contained in the MCIs should be listed in the measurements of the containing MOI. Here, the number of MCI can be zero, one or several. The number of MOI also can be zero, one or several.

Referring to FIG. 2, the attributes of a Measurement Control (MC) include id, state, measurement list, start time, end time, report interval, deliver mode, deliver target, tenant id, referenced MC list, etc.

A new MCI can be added to a MOI. The measurements contained in the MCI should be listed in the measurements of the containing MOI, and the granularityPeriod of a measurement should match one of granularityPeriod in the granularityPeriod list of the measurement.

An existing MCI of a MOI can be updated. The new measurements introduced in the measurement control should be listed in the measurements of the containing MOI, and the updated granularityPeriod of a measurement should match one of granularityPeriod in the granularityPeriod list of the measurement. An existing MCI of a MOI should be updated accordingly if measurements of the MOI updated.

An existing MCI of a MOI can be activated or suspended. After the existing MCI is activated, the third module, for example, the NFMF for managing the MF, starts to collect measurement records. If the existing MCI is suspended, the third module, for example, the NFMF, will stop collecting to measurement records.

The Stereotype of MeasurementControl can be InformationObjectClass (IOC), dataType, SupportIOC or any other Stereotype in 3GPP TS 32.152 or OMC Unified Modeling Language Specification, Version 1.5

Alternatively, the second module further comprises at least any one of:

a module for customizing number of MCIs according to different consumer requirements and associating the MCIs with said containing MOI, hereinafter called fifth module;

a module for aggregating number of MCIs of a parent MOI to number of MCIs of a child MOI, and associating the MCIs of the child with the child MOI, hereinafter called sixth module;

a module for aggregating number of MCIs of number of child MOIs to number of MCIs of a parent MOI, and associating the MCIs of the parent with the parent MOI, hereinafter called seventh module;

a module for deriving number of MCIs of a child MOI from number of MCIS of number of parent MOIs, and associating the MCIs of the child with the child MOI, hereinafter called eighth module;

a module for associating a default MCI with said containing MOI, hereinafter called ninth module, wherein the default MCI including all measurements contained in said containing MOI.

Specifically, the fifth module can customize number of MCIs according to different consumer requirements and the MCIs are associated with the containing MOI. Here, as the PM service consumer, it just need to describe what performance data it expected from the PM service provider/producer, for example which measurement, when is the measurement collected in what interval, etc., but should not mandate how does the provider/producer implement the requirement.

Also, the ninth module associates a default MCI with the containing MOI, wherein the default MCI including all measurements contained in said containing MOI. For example, the ninth module associates and activates a default Measurement Control Instance (MCI) after the containing MOI is created. The default MCI includes all measurements contained in the same MOI, the granularityPeriod of the measurement is the minimum one in the granularityPeriod list of the measurement, the start time is set to now, the end time is forever, the deliver mode is pull, the deliver target is a predefined local address, and the state is active. If there is no other MCI, the third module, for example, the Management Function of the MO, will collect measurement records according to attributes of the default MCI, for example, the measurement name and interval defined in the default MCI.

In this disclosure, the sixth module can aggregate number of MCIs of a parent MOI to number of MCIs of a child MOI, and the MCIs of the child are associated with the child MOI; the seventh module can aggregate number of MCIs of number of child MOIs to number of MCIs of a parent MOI, and the MCIs of the parent are associated with the parent MOI; and the eighth module can derive number of MCIs of a child MOI from number of MCIs of number of parent MOIs, and the MCIs of the child are associated with the child MOI. And only applicable MCI attributes are propagated or derived. Especially, only applicable MCI attributes of child MOIs are propagated from the child MOIs to aggregate MCIs of the parent MOI. The features are described as below:

1. The MCI of a child MOI can be propagated (pushed "down" or pulled "up") from its parent MOIs.

1) After a MCI of a MOI is created and configured, one or more MCIs of child MOIs of the MOI are derived from the MCI of the parent MOI.

2) Alternatively, after a child MOI is created, the sixth module, for example, the child MOI's managing entity, can pull MCI information from its parent MOI and create MCI of this child MOI accordingly.
3) The state and other attributes of a MCI of a child MOI are deduced from the state and related attributes of the MCI of the parent MOI.
4) Only MCI attributes applicable to the child MOI can be derived from the MCI associated with the parent MOI.)
5) The referenced MCI of the parent MOI should be reflected in the child MCI.
6) The update of a MCI of a parent MOI could be reflected on the MCIs of its child MOIs if the MCI is derived from the MCI of the parent MOI.

2. The MCI of a parent MOI can be propagated (only pulled "down") from its child MOIs.
1) After a child MOI is created, the seventh module, for example, the managing entity of its parent MOI, can pull MCI information from the child MOI and create/ update MCI of this parent MOI accordingly, if relevant measurements in MCI of the child MOI were not included in any MCI of the parent MOI.
2) The state and other attributes of a MCI of a parent MOI are deduced from the state and related attributes of the MCI of the child MOI.
3) The referenced MCI of the child MOI should be reflected in the parent MCI.
4) Only applicable MCI attributes of child MOIs are propagated from the child MOIs to aggregate MCIs of the parent MOI.

Here, the parent and child MOIs which propagated MCIs can be managed by same or different Management Entities/ Functions.

Alternatively, the second module further comprises:
a module for creating a common MCI of said containing MOI to support multiple MCIs with same or similar requirements, hereinafter called tenth module.

Here, the tenth module can create a common MCI of the MOI to support multiple MCIs with same or similar requirements. For example, the multiple MCIs with same or similar requirements can share measurement record or report instead of collecting again.

The third module, for example, the NFMF for managing the MF, collects measurement records according to attributes of at least one of said MCIs, for example, measurement name and interval defined in measurements contained in at least one of said MCIs, or other attributes like start/end time, etc., after said at least one MCI is activated. The measurement information includes measurement name and supported granularityPeriod list which are put in the supplementary list.

The Stereotype of supported Measurements can be InformationObjectClass (IOC), dataType, SupportIOC or any other Stereotype in 3GPP TS 32.152 or OMG Unified Modeling Language Specification, Version 1.5.

This disclosure supports many types of Managed Object including Subnetwork, Network Slice, Network Slice Subnet, Managed Element, Managed Function, NFV Network Slice, etc.

The fourth module processes said measurement records and makes them available to number of consumers. Based on the requirements of a contained MCI of a MOI, the third module, for example, the Management Function of the MO, collects measurement records, and the fourth module processes the measurement records and makes them available to number of consumers.

Here, the number of consumers can be zero, one or several.

Alternatively, the fourth module further comprises any one of:
a module for formatting said measurement records to a measurement report, hereinafter called eleventh module;
a module for aggregating measurement records from different MOIs to a measurement report, hereinafter called twelfth module;
a module for keeping raw measurement records, hereinafter called thirteenth module.

Alternatively, the fourth module further comprises any one of:
a module for delivering the measurement report to number of consumers, hereinafter called fourteenth module;
a module for allowing number of consumers to retrieve the measurement report, hereinafter called fifteenth module;
a module for streaming raw measurement records to number of consumers, hereinafter called, sixteenth module.

Specifically, the eleventh module, for example, the Management Function of the MO, formats the measurement records to a measurement report. The fourteenth module stores the collected measurement records and delivers the measurement report to number of consumers. The fifteenth module allows number of consumers to retrieve the measurement report.

Also, the twelfth module, for example, the Management Function of the MO, can aggregate the collected measurement records from different MOIs to a measurement report. The fourteenth module stores the collected measurement records and delivers the measurement report to the consumer. The fifteenth module allows number of consumers to retrieve the measurement report. Here, the way that MF collect, aggregate, format record, store and deliver and/or make available the report can be different.

Alternatively, the thirteenth module, for example, the Management Function of the MO, can keep raw measurement records. The sixteenth module can stream the raw measurement records to the number of consumers.

Then, according to the analytics result based on the measurement reports of a MOI, the attributes, Measurements and Measurement Controls of the MOI can be updated and refined for better support performance management.

Alternatively, said apparatus further comprising:
a module for adding, deleting or updating measurements contained in the several MCIs according to adding, deleting or updating measurements contained in said measurement list.

Alternatively, said apparatus further comprising:
a module for adding, deleting or updating number of MCIs of a MOI according to adding, deleting or updating number of MCIs of number of child MOIs of the MOI.

Alternatively, wherein said apparatus further comprising:
a module for checking state and attributes' value of said at least one MCI.

Here, the above modules can correspond to the same Management Function or correspond to different Management Functions.

In summary, compare to existing solution of 3GPP and prior art, this disclosure has the following advantages:
The solution in this disclosure is aligned with Services Based Management Architecture management paradigm that 3GPP SA5 introduced for 5G management in 3GPP Rel-15, which increased flexibility of both Management and Managed Entity, and enabled reusability of the measurement data and tasks.

Association of the performance measurements with provisioning attributes of the same MOI in the NRM, hence facilitates the creation of closed automation loops addressing performance data collection, analytics, self-optimization and healing.

This disclosure supports measurements reporting and administration in various MOIs at multiple levels, and allows to administrate the measurement control independently on different MOIs, and for different tenants The propagation mechanism introduced in the disclosure allows the performance measurements collection and reporting requirements of one managed object to be automatically populated to its parent/child MOs, hence further simplifies the operation and enables self-organization.

The abbreviations used are described as followed:
5GS: 5G System
SOs: Quality of Service
SLA: Service Level Agreement
NRM: Network Resource Model
MO: Managed Object
MOI: Managed Object Instance
MC: Measurement Control
MCI: Measurement Control Instance
NFV: Network Function Virtualization
MF: Management Function
NS: Network Slice
NSS: Network Slice Subnet
NSSI: NSS Instance
NF: Network Function
NSSMF: Network Slice Subnet Management Function
NFMF: Network Function Management Function It needs to note that the present disclosure can be implemented in software and/or a combination of software and hardware, for example, the disclosure can be implemented by using an Application Specific Integrated Circuit (ASIC), a general purpose computer or any other similar hardware equipment. In one embodiment, the software program of this disclosure can be executed by a processor to accomplish the aforesaid steps or functions. Likewise, the software program (including the relevant data structure) of the to disclosure can be stored in a computer readable recording medium, for example, RAM memory, magneto-optical drive or floppy disk and similar devices. In addition, some steps or functions of the disclosure can be realized by using hardware, for example, a circuit that cooperates with the processor to perform various kind of steps or functions.

Figure 3:
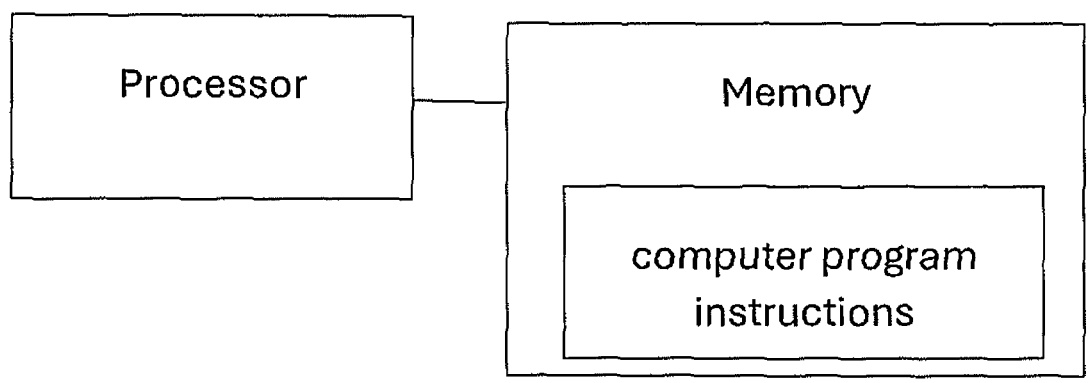
FIG. 3 is a block diagram illustrating an apparatus having a processor, memory and computer program instructions.

In addition, part of the disclosure can be applied as a computer program product, such as a computer program instruction, when the instruction is executed by the computer, the method and/or technical solution according to this disclosure may be called or provided through an operation of the computer. However, the program instruction for calling the method of the disclosure may possibly be stored in a fixed or movable recording medium, and/or be transmitted via broadcasting or other signal carrier mediums, and/or be stored in the operation memory of a computer device that is running according to said program instruction. Here, as illustrated with FIG. 3, there is one device included according to an embodiment of the disclosure, said device comprises a memory for storing computer program instructions and a processor for executing program instructions, this device is triggered to operate the methods and/or technical solutions based on the aforesaid embodiments of the disclosure when the computer program instructions are executed by said processor.

To those skilled in the art, apparently the present disclosure is not limited to the details of the aforementioned exemplary embodiments, moreover, under the premise of not deviating from the spirit or fundamental characteristics of the disclosure, this disclosure can be accomplished in other specific forms. Therefore, the embodiments should be considered exemplary and non-restrictive no matter from which point, the scope of the disclosure is defined by the appended claims instead of the above description, and aims at covering the meanings of the equivalent components falling into the claims and all changes within the scope in this disclosure. Any reference sign in the claims shall not be deemed as limiting the concerned claims. Besides, to apparently the word "comprise/include" does not exclude other components or steps, singular numbers does not exclude complex numbers, the plurality of components or means mentioned in device claims may also be accomplished by one component or means through software or hardware, the wording like first and second are only used to represent names rather than any specific order.

The invention claimed is:

1. A method for controlling over performance measurements, wherein said method comprising:
 associating a measurement list with a containing managed object instance;
 associating number of measurement control instances with said containing managed object instance according to said measurement list;
 collecting measurement records according to attributes of at least one of said measurement control instances after said at least one measurement control instance is activated;
 processing the measurement records and make them available to number of consumers.

2. The method of claim 1, wherein associating number of measurement control instances with said containing managed object instance comprising at least one of:
 customizing number of measurement control instances according to different consumer requirements and associating the measurement control instances with said containing managed object instance;
 aggregating number of measurement control instances of number of child managed object instances to number of measurement control instances of a parent managed object instance, and associating the measurement control instances of the parent with the parent managed object instance;
 associating a default measurement control instance with said containing managed object instance, wherein the default measurement control instance including all measurements contained in said containing managed object instance.

3. The method of claim 2, wherein only applicable measurement control instance attributes of child managed object instances are propagated from the child managed object instances to aggregate measurement control instances of the parent managed object instance.

4. The method of claim 2, wherein associating number of measurement control instances with said containing managed object instance comprising:
 creating a common measurement control instance of said containing managed object instance to support multiple measurement control instances with same or similar requirements.

5. The method of claim 1, wherein processing the measurement records comprising at least one of:
- formatting said measurement records to a measurement report;
- aggregating measurement records from different managed object instances to a measurement report; keeping raw measurement records.

6. The method of claim 5, wherein making the measurement records available to number of consumers comprising at least one of:
- delivering the measurement report to number of consumers;
- allowing consumer to retrieve the measurement report;
- streaming raw measurement records to number of consumers.

7. The method of claim 1, wherein said method further comprising:
- adding, deleting or updating measurements contained in the several measurement control instances according to adding, deleting or updating measurements contained in said measurement list of said containing managed object instance.

8. The method of claim 1, wherein said method further comprising:
- adding, deleting or updating number of measurement control instances of a managed object instance according to adding, deleting or updating number of measurement control instances of number of child managed object instances of the managed object instance.

9. The method of claim 1, wherein said method further comprising:
- checking state and attributes' value of said at least one measurement control instance.

10. The method of claim 1, wherein managed object associated with said managed object instance corresponding to at least one of Subnetwork, Network Slice, Network Slice Subnet, Managed Element, Managed Function, Network Function Virtualization Network Service.

11. An apparatus for controlling over performance measurements, wherein said apparatus comprising:
- at least one processor; and
- at least one memory storing instructions that, when executed with the at least one processor, cause the apparatus to perform:
  - associating a measurement list with a containing managed object instance;
  - associating number of measurement control instances with said containing managed object instance according to said measurement list;
  - collecting measurement records according to attributes of at least one of said measurement control instances after said at least one measurement control instance is activated;
  - processing the measurement records and make them available to number of consumers.

12. The apparatus of claim 11, wherein the instructions, when executed with the at least one processor, cause the apparatus to perform at least one of:
- customizing number of measurement control instances according to different consumer requirements and associating the measurement control instances with said containing managed object instance;
- aggregating number of measurement control instances of number of child managed object instances to number of measurement control instances of a parent managed object instance, and associating the measurement control instances of the parent with the parent managed object instance;
- associating a default measurement control instance with said containing managed object instance, wherein the default measurement control instance including all measurements contained in said containing managed object instance.

13. The apparatus of claim 12, wherein only applicable measurement control instance attributes of child managed object instances are propagated from the child managed object instances to aggregate measurement control instances of the parent managed object instance.

14. The apparatus of claim 12, wherein the instructions, when executed with the at least one processor, cause the apparatus to perform:
- creating a common measurement control instance of said containing managed object instance to support multiple measurement control instances with same or similar requirements.

15. The apparatus of claim 11, wherein the instructions, when executed with the at least one processor, cause the apparatus to perform at least one of:
- formatting said measurement records to a measurement report;
- aggregating measurement records from different managed object instances to a measurement report;
- keeping raw measurement records.

16. The apparatus of claim 11, wherein the instructions, when executed with the at least one processor, cause the apparatus to perform at least one of:
- delivering the measurement report to number of consumers;
- allowing consumer to retrieve the measurement report;
- streaming raw measurement records to number of consumers.

17. The apparatus of claim 11, wherein the instructions, when executed with the at least one processor, cause the apparatus to perform:
- adding, deleting or updating measurements contained in the several measurement control instances according to adding, deleting or updating measurements contained in said measurement list.

18. The apparatus of claim 11, wherein the instructions, when executed with the at least one processor, cause the apparatus to perform:
- adding, deleting or updating number of measurement control instances of a managed object instance according to adding, deleting or updating number of measurement control instances of number of child managed object instances of the managed object instance.

19. The apparatus of claim 11, wherein the instructions, when executed with the at least one processor, cause the apparatus to perform:
- checking state and attributes' value of said at least one measurement control instance.

20. The apparatus of claim 11, wherein managed object associated with said managed object instance corresponding to at least one of Subnetwork, Network Slice, Network Slice Subnet, Managed Element, Managed Function, Network Function Virtualization Network Service.

21. A non-transitory computer readable storage medium, storing computer code, when the computer code is executed, the method of claim 1 is executed.

22. A non-transitory computer program product, when the computer program product is executed, the method of claim 1 is executed.

23. A computer product, comprising: one or more processors; at least one non-transitory storage storing one or more computer programs; when the one or more computer programs are executed by the one or more processors, the one or more processors are caused to implement the method of claim 1.

\* \* \* \* \*